(No Model.)
F. E. CUDELL.
METHOD OF ATTACHING FERRULES TO LEAD PIPE.
No. 579,962. Patented Apr. 6, 1897.
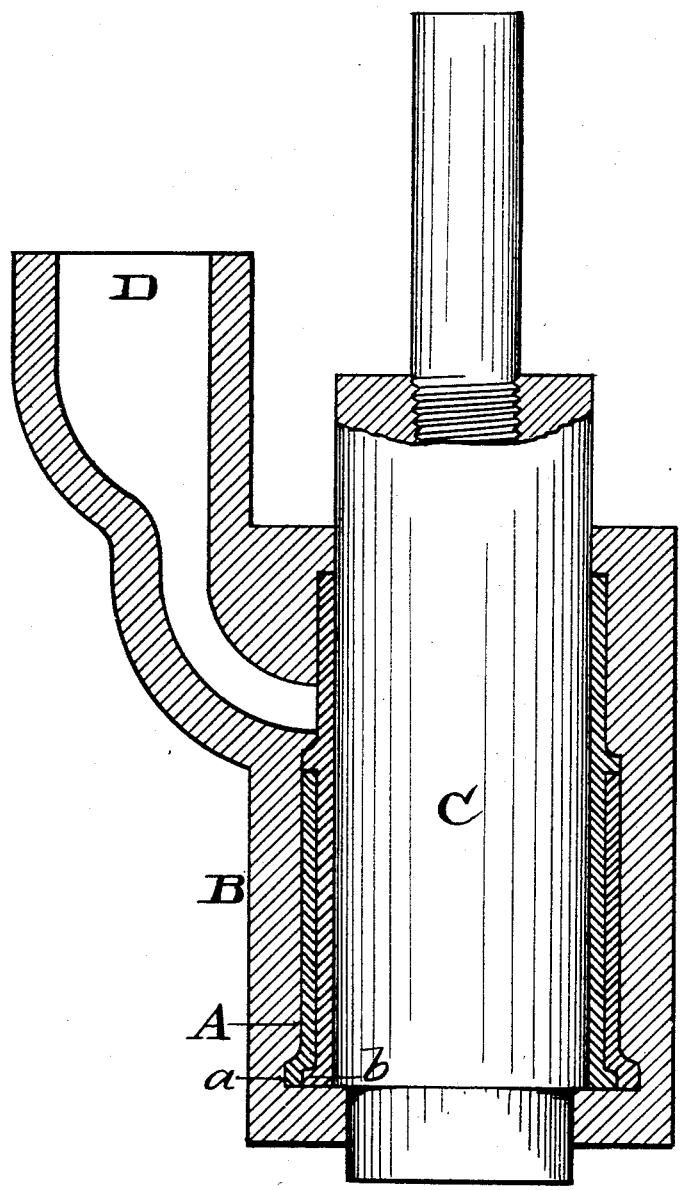
Witnesses,
Jas. Goldberger
J. J. Callow
Inventor,
Frank E. Cudell,
per Geo. W. Tibbitts, Attorney.

UNITED STATES PATENT OFFICE.

FRANK E. CUDELL, OF CLEVELAND, OHIO.

METHOD OF ATTACHING FERRULES TO LEAD PIPE.

SPECIFICATION forming part of Letters Patent No. 579,962, dated April 6, 1897.

Application filed August 31, 1896. Serial No. 604,480. (No model.)

*To all whom it may concern:*

Be it known that I, FRANK E. CUDELL, a citizen of the United States, residing at Cleveland, in the county of Cuyahoga and State of Ohio, have invented certain new and useful Improvements in the Method of Attaching Ferrules to Lead Pipe, of which the following is a specification.

This invention relates to plumbers' ferrules; and it consists in the process or method of combining a cast-iron ferrule with lead pipe by first coating the surface of the iron with zinc, then dipping the ferrule in melted tin or solder, then placing the ferrule still hot in the mold, and then pouring in the melted lead, thus producing a firm, strong, and durable adhesion of the lead with the iron.

In the accompanying drawing the figure is a vertical section of my ferrule and lead pipe combined.

A represents a cast-iron ferrule, on one end of which is provided an outside annular flange $a$ and on the inside an annular rabbet $b$. This ferrule I firmly attach to lead pipe in the following manner: I first place the ferrule in melted zinc, leaving it long enough to produce a coating on the surface of the iron. Next I dip the ferrule into melted tin or solder to prepare the surface for receiving the lead. The ferrule is then placed in the pipe-mold while still hot, and the melted lead is poured into the mold, thus producing a very strong adhesion of the metals and making a solid combination. These ferrules allow calking around them without danger of breaking, cutting, or collapsing when making a joint between the ends of two pipes.

Having described my invention, what I claim is—

The method of attaching ferrules to lead pipe which consists in first placing the iron ferrule in melted zinc to produce a coating on the surface of the iron, next dipping the ferrule into melted solder, then placing the ferrule in the pipe-mold, and finally pouring into the mold the melted lead, as and for the purpose specified.

FRANK E. CUDELL.

Witnesses:
GEO. W. TIBBITTS,
LEWIS W. FORD.